United States Patent
Gupta et al.

(10) Patent No.: US 12,425,398 B2
(45) Date of Patent: *Sep. 23, 2025

(54) MULTI-USER BIOMETRIC AUTHENTICATION ON A MOBILE DEVICE

(71) Applicant: Omnissa, LLC, Mountain View, CA (US)

(72) Inventors: Amit Gupta, San Jose, CA (US); Gaurav Arora, Atlanta, GA (US); Vinayak Srivastava, Bangalore (IN); Nitish Kumar Rai, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/754,038

(22) Filed: Jun. 25, 2024

(65) Prior Publication Data

US 2024/0348604 A1 Oct. 17, 2024

Related U.S. Application Data

(63) Continuation of application No. 17/482,588, filed on Sep. 23, 2021, now Pat. No. 12,041,047.

(30) Foreign Application Priority Data

Jul. 7, 2021 (IN) .............................. 202141030547

(51) Int. Cl.
*H04L 9/40* (2022.01)
*G06N 20/00* (2019.01)
*G06F 21/32* (2013.01)
*G06N 3/0464* (2023.01)

(52) U.S. Cl.
CPC ......... *H04L 63/0861* (2013.01); *G06N 20/00* (2019.01); *G06F 21/32* (2013.01); *G06N 3/0464* (2023.01); *H04L 63/107* (2013.01)

(58) Field of Classification Search
CPC ... G06F 21/32; H04L 63/107; H04L 63/0861; G06N 3/0464
See application file for complete search history.

(56) References Cited

U.S. PATENT DOCUMENTS

| | | | |
|---|---|---|---|
| 8,646,060 B1 | 2/2014 | Ben Ayed | |
| 9,548,979 B1 * | 1/2017 | Johnson | G10L 17/02 |
| 2013/0262873 A1 * | 10/2013 | Read | H04L 63/0861 |
| | | | 713/186 |
| 2016/0171192 A1 * | 6/2016 | Holz | G06F 21/6245 |
| | | | 726/19 |
| 2016/0352713 A1 * | 12/2016 | Grissen | G06F 21/32 |
| 2020/0117779 A1 | 4/2020 | Jain et al. | |
| 2021/0173910 A1 * | 6/2021 | Kursun | G06F 21/32 |

* cited by examiner

*Primary Examiner* — Ellen Tran
(74) *Attorney, Agent, or Firm* — Kim & Stewart LLP

(57) ABSTRACT

Disclosed are various approaches for performing biometric authentication of users using an application running on a client device. A biometric model can be trained using biometric data from a population of users. The biometric model can be used by the client application to authenticate users and can be separate from system-level biometric authentication capabilities of the client device.

20 Claims, 5 Drawing Sheets

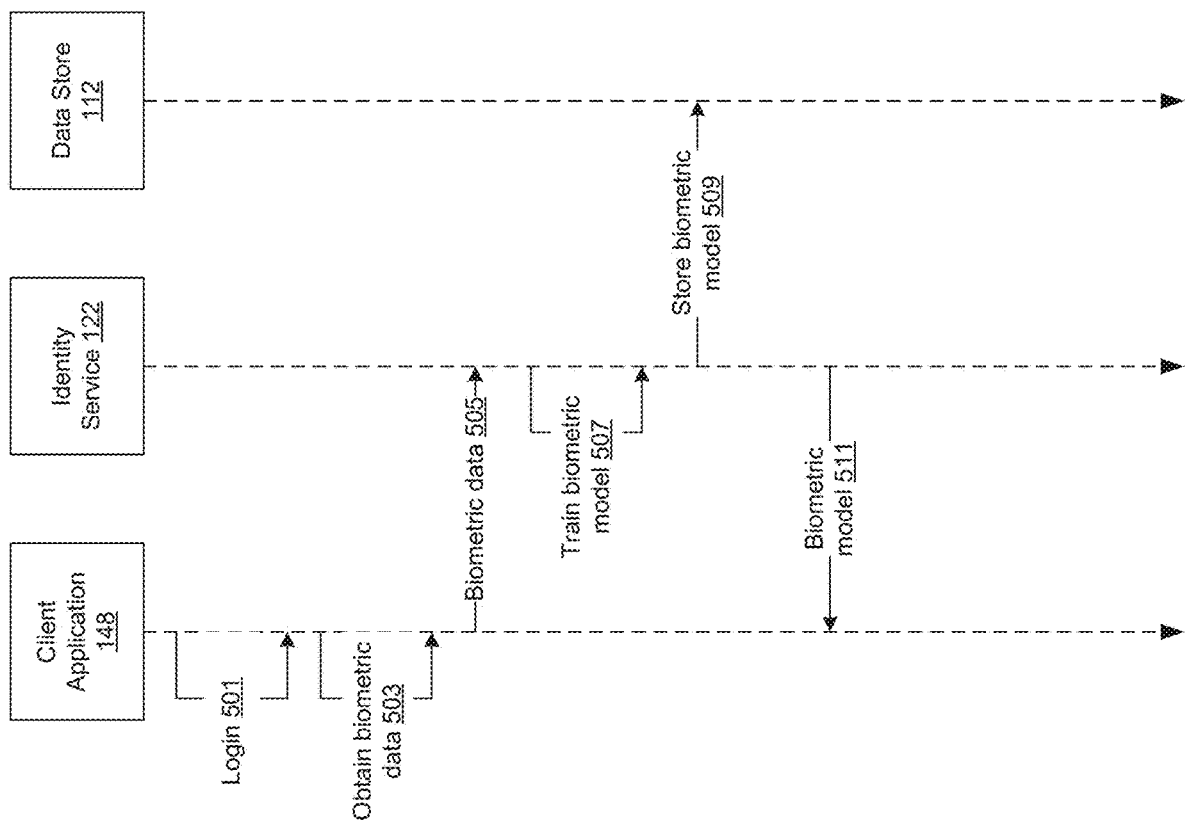

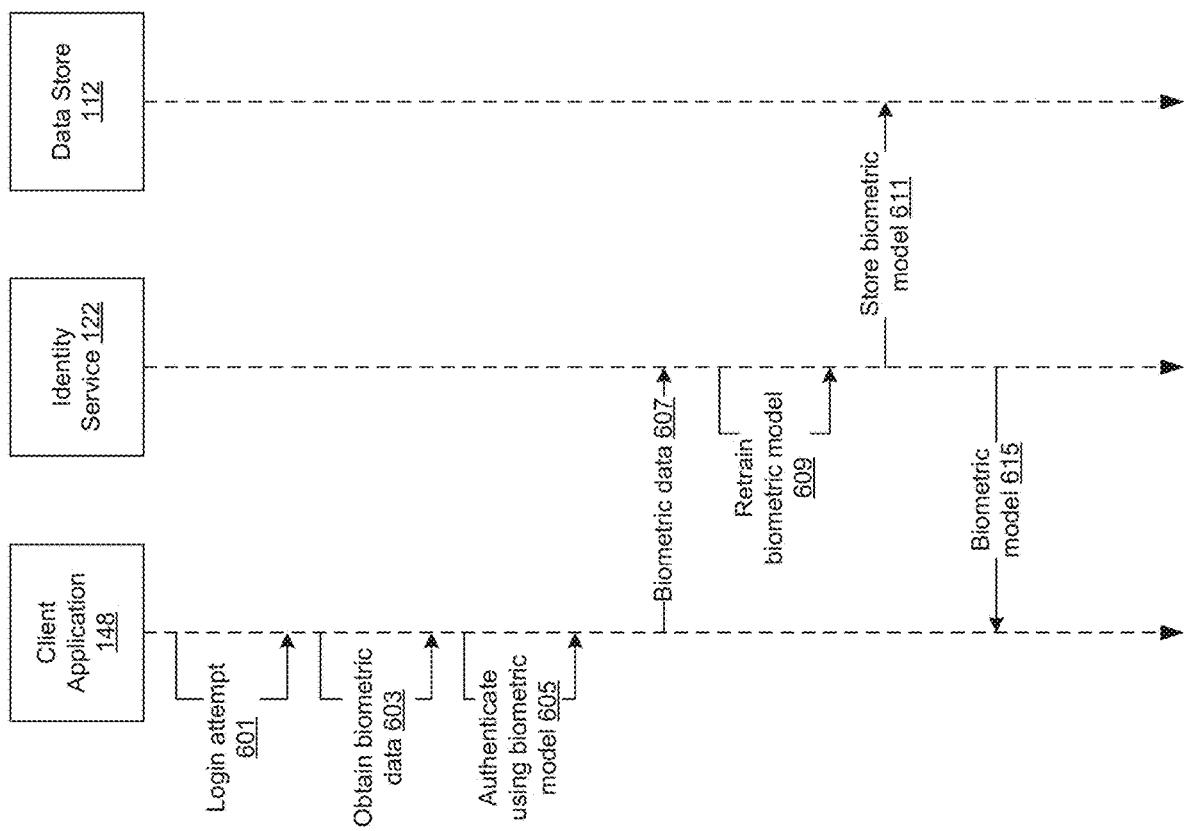

MULTI-USER BIOMETRIC AUTHENTICATION ON A MOBILE DEVICE

RELATED APPLICATIONS

This application is a continuation of U.S. patent application Ser. No. 17/482,588, filed Sep. 23, 2021, and issued as U.S. Pat. No. 12,041,047, which claims benefit under 35 U.S.C. 119 (a)-(d) to Indian Patent Application number 202141030547, filed Jul. 7, 2021, both of which are incorporated by reference herein in their entirety for all purposes.

BACKGROUND

In today's environment, smartphones and other devices are becoming more and more ubiquitous and more essential to users. In certain environments, a shared device is utilized by multiple users for various purposes. For example, in a warehouse or retail environment, employees and workers might utilize enterprise issued devices that remain on premises after a user's shift. Other users might utilize the same device later in the day, on a different shift, or even on the same shift. User authentication of these users to access enterprise applications can be an important security measure to ensure that only authorized users are utilizing these devices.

For example, in a retail environment, a first worker might utilize a device to carry out the worker's responsibilities. The first worker can be authenticated by the device or an application on the device. Another worker might require use of the device to assist a customer. Enterprise policy might require that the second worker authenticate his or her identity before utilizing the device. In fast-paced environments, such as retail or warehouse environments, require password or PIN-based authentication can waste valuable time, which can add up over the course of months or years in the environment. System-level biometric authentication is often impractical in these environments because these authentication capabilities provided by a device or operating system often only allow a single user to be authenticated per device. Therefore, in multi-user environments, relying on system-level biometric authentication can also be impractical.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 5 is a flowchart that illustrates functionality according to examples of the disclosure.

FIG. 6 is a flowchart that illustrates functionality according to examples of the disclosure.

DETAILED DESCRIPTION

Figure 1:
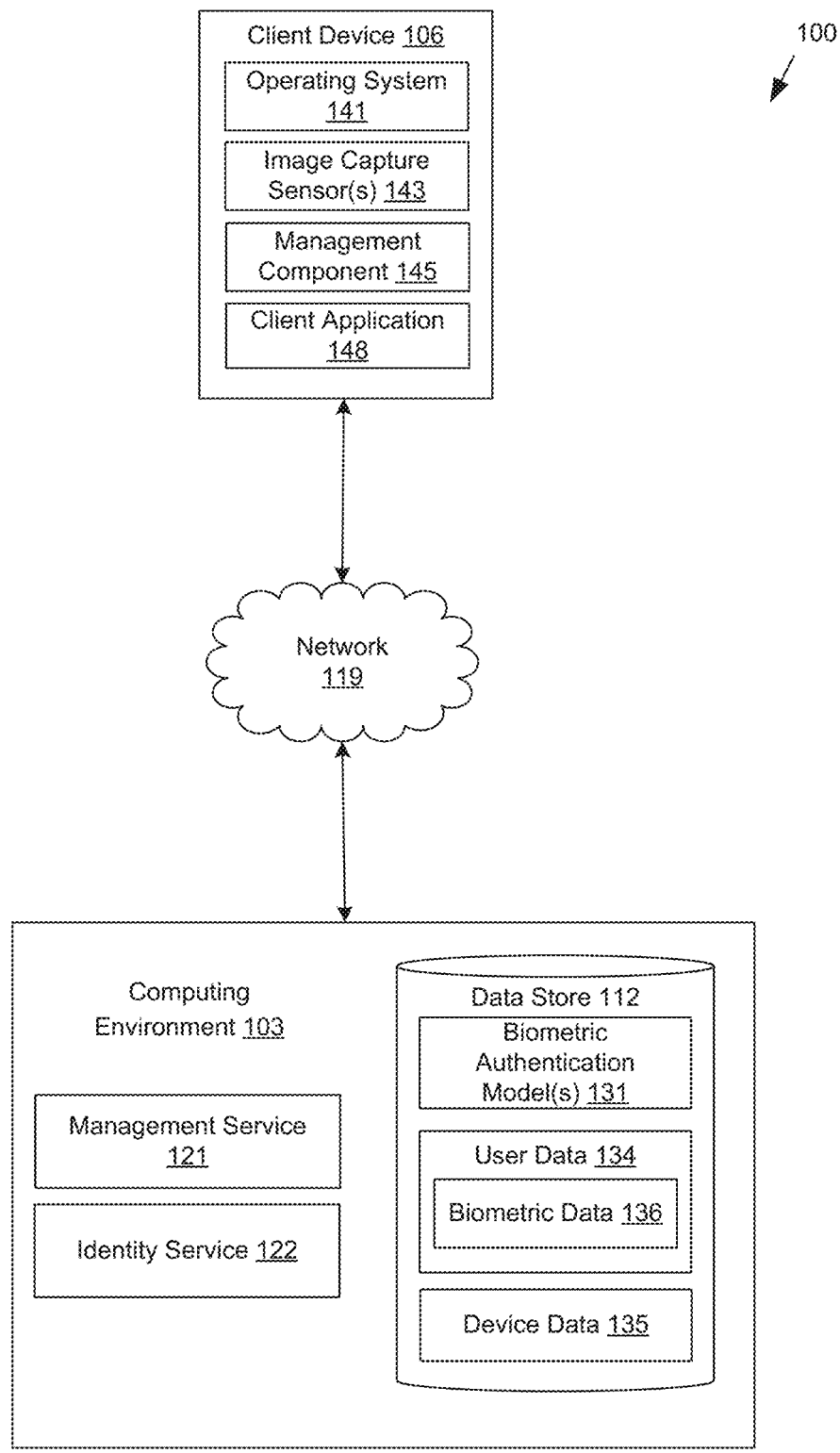
FIG. 1 is a schematic block diagram depicting an example implementation according to various examples of the disclosure.

Disclosed are examples of a system that facilitates biometric authentication that authenticates access to an application running on a client device. The biometric authentication can be utilized to access an application in a shared environment, such as an office or retail environment in which a client device is utilized by multiple users. For example, in an environment where shift workers are sharing a pool of devices, biometric authentication can be utilized to authenticate access to the application by different shift workers when their respective shifts change over. In an environment in which multiple users share devices at the same time, biometric authentication can be utilized to authentication access to the application by different workers as they share the pool of devices.

In modern mobile device environments, a biometric authentication capability can be provided by an operating system that utilizes specialized hardware in a client device. Biometric authentication capabilities provided by a device-maker can be tightly controlled by the operating system and often restrictive in its extensibility or utilization by third party applications on the device. These capabilities, also referred to as system level biometric authentication capabilities herein, often restrict the ability to biometrically authenticate more than one user. In other words, system-level biometric authentication on mobile devices is often restricted to a single user per device. Additionally, the biometric data is often inaccessible to third party applications, as it can be stored in a secure storage area, sometimes referred to as a secure enclave or secure element, on the client device. Such a secure storage area is also often inaccessible to third party applications. While third party applications can sometimes utilize application programming interfaces (APIs) provided by the operating system to utilize biometric authentication, third party applications are often unable to utilize these APIs to facilitate multi-user biometric authentication because system-level biometric authentication is often limited to a single user per device.

Examples of this disclosure can allow an application distributed by the enterprise to utilize biometric authentication utilizing one or more image sensors provided by the client device, as access to image sensors can be provided to the third party applications by the operating system. Additionally, examples of the disclosure can utilize a facial recognition model that can be trained using a machine learning process to perform the biometric authentication process. The facial recognition model can be stored locally on the client device. The facial recognition model can also be limited to a population of users according to a particular category, such as location, role, or other category of users. By utilizing a facial recognition model that is stored locally on the device and that is separate from system-level biometric capabilities provided by the client device and/or operating system, multi-user biometric authentication can be utilized to restrict access to a client application installed on the client device.

FIG. 1 illustrates an example of a networked environment 100 according to examples of the disclosure. In the depicted network environment 100, a computing environment 103 is in communication with at least one client device 106 over a network 119.

The network 119 includes the Internet, intranets, extranets, wide area networks (WANs), local area networks (LANs), wired networks, wireless networks, other suitable networks, or any combination of two or more such networks.

The networks can include satellite networks, cable networks, Ethernet networks, and other types of networks.

The computing environment 103 can be a computing environment that is operated by an enterprise, such as a business or other organization. The computing environment 103 can include a computing device, such as a server computer, that provides computing capabilities. Alternatively, the computing environment 103 can employ multiple computing devices that are arranged in one or more server banks or computer banks. In one example, the computing devices can be located in a single installation. In another example, the computing devices for the computing environment 103 can be distributed among multiple different geographical locations. In one case, the computing environment 103 includes multiple computing devices that together can form a hosted computing resource or a grid computing resource. Additionally, the computing environment 103 can operate as an elastic computing resource where the allotted capacity of computing-related resources, such as processing resources, network resources, and storage resources, can vary over time. In other examples, the computing environment 103 can include or be operated as one or more virtualized computer instances that can be executed to perform the functionality that is described herein.

Various applications or other functionality can be executed in the computing environment 103. Also, various data can be stored in a data store 112 that can be accessible to the computing environment 103. The data store 112 can be representative of a plurality of data stores 112. The data stored in the data store 112 can be associated with the operation of the various applications or functional entities described below.

The components executed on the computing environment 103 can include a management service 121, an identity service 122, and other applications, services, processes, systems, engines, or functionality not discussed in detail herein.

In some implementations or in certain cases, devices associated with users in a corporate environment can be managed devices that are enrolled with a management service 121. The management service 121 can be executed by the computing environment 103 in an on-premises implementation or in another computing environment that is separate from the computing environment 103. The management service 121 can also be provided with access to information about users, physical resources, physical access credentials.

The management service 121 can monitor and oversee the operation of one or more client devices 106 by administrators. In some examples, the management service 121 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 121. The management service 121 can initiate installation of applications as managed applications. The management service 121 can also initiate installation of configuration profiles that can be accessed by certain applications installed on a client device 106.

The management service 121 can include a management console that can allow administrators to manage client devices 106 that are enrolled with the management service 121. User interfaces can allow an administrator to define policies for a user account or client devices 106 associated with an enterprise environment. The user interfaces can also include, for example, presentations of statistics or other information regarding the client devices 106 that can be managed by the management service 121.

The identity service 122 can provide a biometric authentication model to a client device 106. A biometric authentication model can be a model that is generated using machine learning that can perform facial recognition, fingerprint recognition, or other biometric authentication. A biometric authentication model can be generated by the identity service 122 but executed on the client device 106 without requiring intervention by the identity service 122.

The identity service 122 can also receive biometric data corresponding to a user. The biometric data can include one or more images or other scans of a user's face, retina(s), fingerprint(s), voice, body, or other biometric data that can be utilized to authenticate the user. The identity service 122 can generate or update a biometric authentication model that can be provided to a client device 106 and used for local authentication of users.

The identity service 122 can also provide single sign-on or identity management features for users of an enterprise. To access one or more applications that are provided by an enterprise to its users, the user can authenticate his or her access to those applications through the identity service 122. The identity service 122 can consult stored authentication data to determine whether a user's identity has been authenticated and provide the user's device one or more authentication tokens or identity assertions, which can in turn be provided to other applications or services to authenticate the user's identity.

The identity service 122 can carry out federated user authentication on behalf of an enterprise to allow the user to access various applications provided by the enterprise to its users. For example, the identity service 122 can implement OAuth, SAML, or similar protocols that allow for federated user authorization or authentication. The identity service 122 can verify a user's credentials or identity and provide an authentication token, such as a SAML assertion, that can be provided to an application service by an application on a client device 106 to authenticate the user's access to a service provided by the enterprise.

The data stored in the data store 112 can include biometric authentication models 131, user data 134, and potentially other information to support the execution of the management service 121 and/or identity service 122. A biometric authentication model 131 can include, for example, a convolutional neural network (CNN) that can process biometric inputs, such as imagery, scans, or other inputs corresponding to a user, and generate an output as to whether the user is authenticated. A biometric authentication model 131 can include a supervised model that receives inputs corresponding to biometric data and determine whether the user is authenticated. He biometric authentication model 131 can be provided to a client device 106 so that user authentication based upon biometric inputs can be performed by the client device 106 without consulting the identity service 122 in real time. In other words, a biometric authentication model 131 can enable offline biometric authentication of users on behalf of the identity service 122.

A biometric authentication model 131 can include data that incorporates biometric data of multiple users. Accordingly, the identity service 122 can generate a biometric authentication model 131 for a population of multiple users that can be authenticated by the client device 106. Accordingly, the data store 112 can store multiple biometric authentication models 131 that correspond to different locations, groups, or other types of categories in which users can be grouped. By utilizing different categories for different biometric authentication models 131, the size of a respective biometric authentication model 131 that is deployed to a particular client device 106 can be minimized because the biometric authentication model 131 need not be able to authenticate all users in an enterprise or in a user directory for the enterprise. Instead, only the users assigned to a particular category, such as a location in which the client device 106 is deployed, are incorporated into the biometric authentication model 131 that is deployed to that client device 106.

User data 134 can include user identifiers, authentication credentials, other identifying information about users, and information about devices to which users are assigned, such as identifying information about a user's smartphone, wearable devices, or other computing devices that are assigned to or used by the user. User data 134 can also include biometric data 136 corresponding to a user. Biometric data 136 can be utilized to generate or train a biometric authentication model 131 that the identity service 122 generates or trains to authenticate a respective user, among other users. Biometric data 136 can include images or scans of a user's face, retinas, fingerprints, or other biometric data that can be utilized to distinguish a user from other users. In an example of this disclosure, the biometric data 136 can include one or more images of a user's face that can be captured by a client device 106 or other device, which can be utilized to train a biometric authentication model 131 to subsequently authenticate the user.

Device data 135 can include information about user devices that are being used by the users within the enterprise. Device data 135 can include device identifiers, security certificates, configuration profiles, and other information about devices. Device records in the device data 135 can correspond to client devices 106 that are enrolled as managed devices with the management service 121. A device record can include various security settings selected for enforcement on a client device 106 that is enrolled with the management service 121. Accordingly, a device record can include a device identifier associated with a device, such as the client device 106, one or more device certificates, a compliance status, and other data. In some examples, a device record can also identify a user associated with a particular client device 106. The compliance status can indicate whether a particular client device 106 is in compliance with one or more compliance rules.

More specifically, the device record can include one or more of: data describing the identity, type and components of the client device 106; data describing the state of the client device 106; data describing organizational groups to which the client device 106 belongs; data describing compliance rules with which the client device 106 must comply; data describing management policies that specify if, when, and how the client device 106 is permitted to function; and data describing a command queue associated with the client device 106.

For example, data describing the identity, type and components of the client device 106 can specify at least one of more of: a unique identifier associated with the client device 106 (e.g., identifier issued by a manufacturer of the client device or the management service 121), a device type of the client device (e.g., a smartphone, a tablet computing, a laptop computer, a desktop computer, a server computer, or a virtualized instance of any of such computer types), and various software and hardware components of the client device 106 (e.g., operating system [or kernel or bios] type and version, processor type and speed, memory type and size, network interface types, various I/O component types such as camera, touchscreen, keyboard, mouse, printer). More particularly, a device record associated with a client device 106 comprising a network connection television can specify that the client device 106 is a device type of phone, that the client device 106 has an active connection to the Internet, and that the client device 106 has a camera enabled.

Next, data describing the state of the client device 106 can specify, for instance, various settings that are applied to the client device 106, various applications that are installed on or being executed by the client device 106, and various files that are installed on or are accessible to the client device 106. Additionally, the data describing the state of the client device 106 can specify information related to the management of the client device 106, such as the last time the client device 106 provided its state information to the management service 121, whether the client device 106 is in a state of compliance with any applicable compliance rules, and whether any remedial actions have been (or are to be) taken as a result of a noncompliance with any applicable compliance rules. Also being related to the management of the client device 106, the data describing organizational groups to which the client device 106 belongs can, for example, include any organizational groups of which the client device 106 is a member (by virtue of a static hard coded relationship between the client device 106 and an organizational group, or by virtue of a dynamic evaluation of a membership condition associated with an organizational group, as described later herein).

Further, the device record can include data describing a command queue associated with the client device 106. For example, the management service 121 can maintain a command queue of commands that are designated for execution against the client device 106. As described herein, a client device 106 can be provisioned by the management service 121 by causing resources to be installed or stored on the client device 106. To implement such process, the management service 121 can store a command related to provisioning in the command queue. Additionally, the management service 121 can store a command related to a remedial action associated with a compliance rule in the command queue, in the event that it is determined that a rule condition associated with the compliance rule has occurred. Whether a provisioning command or a command related to a remedial action is stored in the command queue, the client device 106 can retrieve commands stored in its command queue through various ways that are described later herein (e.g., through a client-server "pull system" or through a client-server "push system").

Finally, data describing compliance rules with which the client device 106 must comply can, for instance, specify one or more security policies to which the client device 106 must adhere, a compliance status of the client device 106, and one or more remedial actions that should be performed in the event that an associated rule condition occurs, as described later herein. In some embodiments, the data describing compliance rules and the data describing management policies are obtained from an organizational record associated with an organizational group to which the client device 106 is a member (i.e., the compliance rules associated with the organizational group are reflected in the device record of the member client device 106).

A compliance status of a client device 106 represents whether the device is in compliance with one or more compliance rules. Various compliance rules can be enforced on the client device 106 by the management service 121. Compliance rules can be based on time, geographical location, or device and network properties. For instance, the client device 106 can satisfy a compliance rule when the client device 106 is located within a particular geographic location. The client device 106 can satisfy a compliance rule in other examples when the client device 106 is in communication with a particular local area network, such as a particular local area network that is managed by the computing environment 103. Furthermore, a compliance rule in another example can be based upon the time and date matching specified values.

A compliance rule can specify that a client device 106 is required to be powered off or be in a low power "sleep" state during a specified time period. Another compliance rule can specify that a client device 106 is required to be powered on or be in a normal operation "awake" state during a specified time period. As another example, a compliance rule can specify that a client device 106 is prohibited from rendering content that has been designated as confidential. A compliance rule can also specify whether a camera associated with the client device 106 must be enabled or disabled. The compliance rule can also specify certain times of the day, week, or year in which certain hardware or software features are permitted to be enabled or disabled.

Another example of a compliance rule involves whether a user belongs to a particular user group. For instance, a compliance rule can include a whitelist or a blacklist that specifies whether particular users or groups of users are authorized to perform various functionalities, such as installing or executing a particular application.

Other examples of compliance rules include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule can specify that the client device 106 is required to authenticate a user using a password or personal identification number (PIN) in order to unlock the client device 106.

A compliance rule can also require that the client device 106 has device encryption enabled, where data stored on the device is stored in an encrypted form. The data can be encrypted by a device certificate. A compliance rule can also require that the client device 106 be enrolled with the management service 121 as a managed device. Another compliance rule can specify that the user is required to accept the terms of service that are presented by the management component 145 on the client device 106. As another example, a compliance rule can specify that the management component 145 is required to periodically communicate or "check-in" with the management service 121 to report on its status. If a threshold amount of time has elapsed since the previous check-in of the client device 106, the client device 106 can be considered to have violated this compliance rule.

Another compliance rule can specify that a client device 106 run one of a specified variant or version of a particular operating system. A compliance rule can also specify that an enrolled device be manufactured by a particular manufacturer or have a particular manufacturer identifier. Another compliance rule can specify that an enrolled device be a particular model name or model number. A client device 106 can also be considered out of compliance if the device is in a data roaming mode or has used a threshold amount of a periodic network data usage allowance.

A compliance rule can also identify a list of required applications that must be installed on the client device 106 or a list of forbidden applications that cannot be installed on the client device 106. The management component 145 can remove a forbidden application or install a missing required application on the client device 106 in response to detecting a violation of such a compliance rule. A compliance rule can also require the presence of a mobile device management (MDM) profile, an MDM storage area, an application profile, and/or a configuration profile. The management component 145 can obtain and store missing required data or containers on the client device 106 in response to detecting a violation of such a compliance rule.

Therefore, the compliance status indicates whether and to what extent a particular client device 106 is compliant with compliance rules assigned to the client device 106 by the management service 121. The compliance status can be determined by a management component 145 on the client device 106 that analyzes the status of the client device 106 and reports compliance to the management service 121. In other examples, the compliance status can be determined by the management service 121 based upon state information describing the client device 106, which can be reported by the management component 145. The compliance status can also include the state of various hardware or software features of the client device 106 without respect to whether the status of the features are determined by a compliance rule.

User data 134 can also contain information about users who are associated with client devices 106 that are enrolled with the management service 121. User data 134 can include profile information about a user, authentication information about a user, applications that are installed on client devices 106 associated with the user, and other user information. For example, user data 134 can include information about client devices 106 that are associated with a user account of the user, enterprise resources to which a particular user has access, such as email, calendar data, documents, media, applications, network sites, or other resources. The user data 134 can also identify one or more user groups of which a particular user is a member, which can in turn define the access rights of the user to one or more enterprise resources as well as identify which applications should be deployed to a client device 106 associated with the user. To this end, the user data 134 can further identify one or more device identifiers that can uniquely identify client devices 106 that are associated with a user account of the user. In some implementations, some of the user data 134 can be stored by or in locations specified by the directory service rather than in the data store 112 associated with the management service 121.

The client device 106 can represent multiple client devices 106 coupled to the network 119. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user, or a device that is owned by the user. The client device 106, when provisioned, can be enrolled with the management service 121 as a managed device of the enterprise. In some implementations, the client device 106 can be an unmanaged device that is not enrolled with a management service 121.

In one implementation, the client device 106 can execute an operating system 141. The operating system 141 can provide one or more management APIs that allow the management service 121 to remotely manage a device. The operating system 141 can also provide one or more biometric authentication APIs that allow applications installed on the client device 106 to utilize biometric authentication. However, as noted above, system-level biometric authentication often only provides the ability to authenticate a single user that provided biometric data to the operating system 141, which is often directly inaccessible to third party applications. Accordingly, the biometric data provided to the operating system 141 cannot be utilized to generate a biometric authentication model 131 that can be distributed to other devices within the enterprise. Additionally, the operating system 141 may not provide direct access to certain hardware components on the client device 106 that are utilized for system-level biometric authentication. For example, fingerprint sensors, facial recognition sensors, retinal scanners, or other biometric hardware may be inaccessible to a third party application on the client device 106, which means that these sensors may be inaccessible for generating or updating a biometric authentication model 131.

The client device 106 can also execute a management component 145 that can communicate with the management service 121 to facilitate management of the client device 106. The management component 145 can communicate with the management service 121 to enforce management policies and compliance rules on the client device 106. For example, the management component 145 can enforce data security requirements, install, remove or update security certificates, or write, modify or delete certain data from the client device 106. The management component 145 can also monitor the client device 106, generate state information describing the client device 106, and provide the management service 121 with such state information. For example, the state information can include the network activity of the client device 106, the location of the client device 106, whether system-level password or personal identification number (PIN) authentication is enforced, and/or whether other compliance rules are being complied with by the client device 106. In one example, the state information can be generated by the management component 145 by receiving compliance rules from the management service 121 over the network 119, comparing the state of the client device 106 to the compliance rules, and determining whether the client device 106 fails to satisfy the compliance rules.

To carry out local management of a client device 106, the management component 145 can be installed and executed with elevated or administrative privileges on the client device 106. In some scenarios, the operating system of the client device 106 can allow a particular application or package to be identified as a device owner or a device administrator, which can in turn configure the client device 106 using such privileges.

The client device 106 can include image capture sensors 143. For example, a front facing camera, or a "selfie camera," can be utilized to capture images of the user's face, which can be utilized to perform biometric authentication of the user using a biometric authentication model 131 obtained by the client device 106. Additionally, imagery captured by the image capture sensors 143 can be utilized to enroll the user into a biometric authentication program associated with the enterprise that biometrically authenticates the user's access to the client application 148.

The client device 106 can comprise a device that is utilized in an enterprise environment and shared by multiple users. For example, in a retail setting, a client device 106 can be utilized by multiple workers assisting customers for various reasons. In a logistics environment, a pool of client devices 106 can be utilized by shift workers. When the shift of a first worker ends, the device can be utilized by a different worker on a subsequent shift. In various scenarios, user authentication is required by the enterprise to authenticate a user's access to one or more applications on the client device 106. For example, a client application 148 can be utilized to access enterprise data, perform enterprise tasks, or perform other work functions. Accordingly, the client application 148 can authenticate a user's access to the data, features, or tasks facilitated by the client application 148.

In one scenario, the client application 148 can request a username and/or password of a user attempting to access the client application 148. Requiring periodic password authentication of the user can cost the user potentially valuable time. Again, because system-level biometric authentication often fails to provide for multi-user scenarios, system-level biometric authentication capabilities of the client device 106 are often infeasible in a multi-user environment. Accordingly, the client application 148 can obtain a biometric authentication model 131 that can authenticate a population of authorized users. The biometric authentication model 131 utilized by the client application 148 is separate from system-level biometric authentication capabilities provided by the client device 106 and/or the operating system 141 of the client device 106.

In some implementations, the biometric authentication model 131 can be obtained by the management component 145 and installed as a configuration profile onto the client device 106. In other implementations, the client application 148 can be configured or provisioned by a user or administrator, and the client application 148 can request a biometric authentication model 131 corresponding to the location, organization, group, or other category from the identity service 122.

The client application 148 or another application on the client device 106 can facilitate collection of biometric data 136 corresponding to a user. The collected biometric data 136 can be used to train or update a biometric authentication model 131. In one example, the client application 148 can request an initial authentication or initial enrollment of the user into a biometric authentication process. The user's credentials, such as a username, password, and other authentication factors, can be provided over the network 119 to the identity service 122 and authenticated. If authenticated, the client application 148 can obtain biometric data 136, such as one or more image using the image capture sensors 143. The images can be captured of the user's face, head, and/or neck area. The images can be provided to the identity service 122, which can create or update a biometric authentication model 131 so that the biometric authentication model 131 can subsequently authenticate the user using the biometric data 136.

Figure 2:
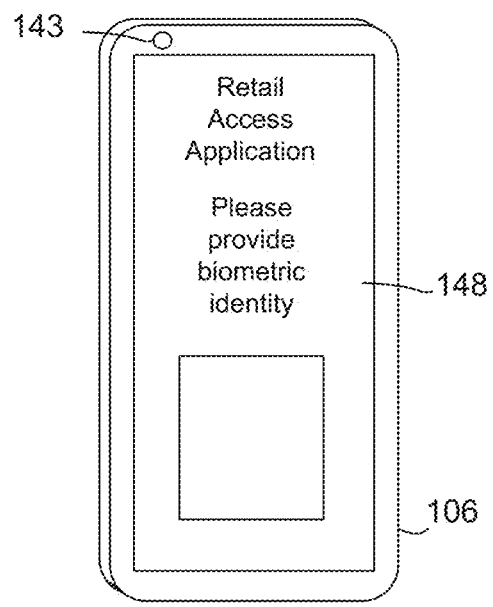
FIG. 2 is an example of a client application executed by a client device according to examples of the disclosure.

Referring next to FIG. 2, shown is an example of a client application 148 executed by a client device 106 that can perform biometric authentication of a user using a biometric authentication model 131 obtained from the identity service 122. In the example of FIG. 2, the client device 106 is running a client application 148. The client application 148 can be an application distributed by an enterprise on a client device 106. The enterprise can enable multi-user biometric authentication according to examples of the disclosure.

Accordingly, to access the client application 148, the client application 148 can request that the user provides his or her biometric credentials. The biometric credentials can be obtained using the image capture sensors 143 or other hardware resources of the client device 106 that are accessible to the client application 148. As noted above, in some mobile device ecosystems or operating systems, biometric sensors utilized by system-level biometric authentication are often inaccessible to third party applications such as the client application 148. Therefore, the client application 148 can prompt the user to provide biometric credentials, such as by capturing an image of the user's face using the image capture sensors 143 on the client device 106.

Figure 3:
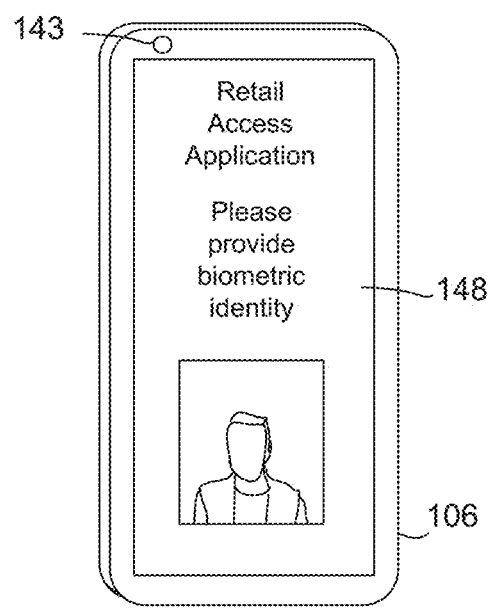
FIG. 3 is an example of a client application executed by a client device according to examples of the disclosure.

Continuing the example of FIG. 2, reference is now made to FIG. 3. In FIG. 3, the user is providing his or her biometric credentials using the image capture sensors 143 of the client device 106. In one example, the client application 148 can capture multiple images or samples of the biometric credentials if a biometric authentication model 131 that is being utilized by the client application 148 requires more than one image sample in order to authenticate the user.

The client application 148 can utilize a biometric authentication model 131 obtained from the identity service 122 that can process biometric data captured by the client application 148, such as images of the user captured by the image capture sensors 143, and generate an indication of whether the user's access to the client application 148 is authenticated. In some examples, the biometric authentication model 131 can return a user identifier or authentication token corresponding to the user to the client application 148, and the client application 148 can provide the identifier or token to the identity service 122 or other services that require the identity of the user to perform additional tasks or actions in the client application 148.

Figure 4:
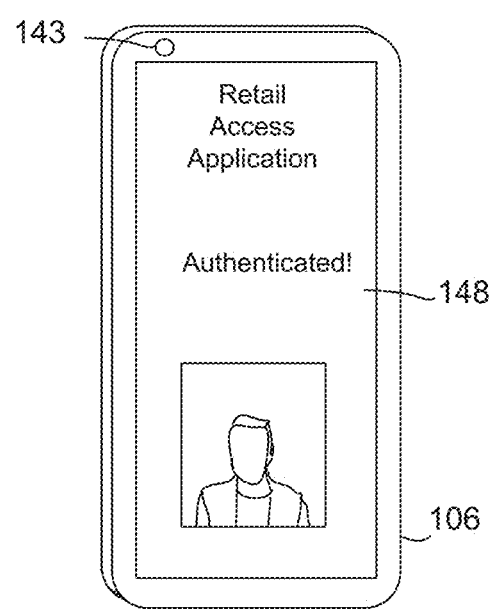
FIG. 4 is an example of a client application executed by a client device according to examples of the disclosure.

Continuing the example of FIG. 3, reference is made to FIG. 4. As shown in FIG. 4, the client application 148 has authenticated the user based upon the biometric data submitted to the client application 148. The client application 148 authenticated the user using a biometric authentication model 131 obtained from the identity service 122. The biometric authentication model 131 can be generated by the identity service 122 for a particular location in which the client device 106 is deployed, such as in a particular office, retail location, warehouse, or the like. Accordingly, the identity service 122 can generate and/or maintain multiple biometric authentication models 131 for various locations or other categories of users.

Additionally, the client application 148 can submit the captured biometric data, which in the depicted example is one or more image captured using the image capture sensors 143, to the identity service 122. The identity service 122 can retrain the biometric authentication models 131 that are configured to authenticate the user. There can be potentially multiple biometric authentication models 131 that are configured to authenticate the user. The identity service 122 can then distribute the updated biometric authentication models 131 to respective client devices 106 for use by various instances of the client application 148.

Referring to FIG. 5, shown is a sequence diagram that provides one example of how the client application 148 can enroll a user into a biometric authentication program utilized by the enterprise for authenticating access to the client application 148. The sequence diagram of FIG. 5 illustrates one example of how the client application 148 can facilitate enrollment of a user with a biometric authentication system and how the identity service 122 can provide a biometric authentication model 131 to a client device 106 upon enrollment.

First, at step 501, the client application 148 can require the user to log into the client application 148. In one example, the client application 148 can determine that the user's biometric credentials could not be authenticated and require the user to provide a username, password, and/or other authentication factors. Authentication of the user's username, password, and/or other authentication factors can be performed by the client application 148 with the assistant of the identity service 122. In one example, the client application 148 can provide the credentials to the identity service 122, which can in turn provide an indication of whether the user is authenticated to access the client application 148.

At step 503, the client application 148 can obtain biometric data from the user. The biometric data can be obtained using image capture sensors 143 of the client device 106. The biometric data can comprise one or more pictures of the user captured using the image capture sensors 143. In some examples, the identity service 122 can require multiple images of the user to train a biometric authentication model 131 to recognize or authenticate a user.

At step 505, the client application 148 can provide the captured biometric data to the identity service 122. Again, the biometric data can comprise one or more pictures of the user captured using the image capture sensors 143. In some examples, the identity service 122 can require multiple images of the user to train a biometric authentication model 131 to recognize or authenticate a user. In some examples, the captured biometric data can be stored in the data store 112 as biometric data 136 linked to a user account.

At step 507, the identity service 122 can train or generate a biometric authentication model 131 to recognize or authenticate the user based upon the captured biometric data. In one example, the identity service 122 can train a machine learning process, such as a facial recognition model, to accept as inputs one or more images. The biometric authentication model 131 can be trained to identify a user corresponding to the biometric data. The biometric authentication model 131 can be trained using an image dataset corresponding to facial image data of a population of users. In one example, the identity service 122 identify one or more locations, groups, organizations, or other categories by which biometric authentication models 131 are separated. The identity service 122 can then retrain or update the respective biometric authentication models 131 that should be able to authenticate the user. In other words, the identity service 122 can determine which other client device 106 or instances of the client application 148 that the user is entitled to access and updated their respective biometric authentication models 131.

At step 509, the identity service 122 can store the biometric authentication model 131 trained at step 507 in the data store 112. The biometric authentication model 131 can be provide to other client devices 106 that are deployed in the particular location or that are otherwise associated with the same biometric authentication model 131.

At step 511, the biometric authentication model 131 can be provided to one or more instances of the client application 148. The identity service 122 can provide the biometric authentication model 131 only to those instances of the client application 148 that are associated with a location, group, organization, or other category for which the biometric authentication model 131 is configured to authenticate users based upon biometric data 136.

For example, the identity service 122 can provide to a client device 106 a biometric authentication model 131 that is trained based upon biometric data 136 for users associated with a particular location. The biometric authentication model 131 provided to the client device 106 can be trained to only authenticate users who are also authorized to access the client application 148 at the location. A biometric authentication model 131 provided to a client device 106 at a different location can be configured to only authenticate users who are authorized to access the different location, and the population of users can vary from location to location. In this way, the size of the biometric authentication model 131 provided to respective client device 106 can be reduced because a client application 148 associated with a specific location does not require the ability to authenticate every user in the enterprise.

Referring to FIG. 6, shown is a sequence diagram that provides one example of how the client application 148 can authenticate a user using captured biometric data 136 and a biometric authentication model 131.

At step 601, the client application 148 can detect a login attempt. The login attempt can be detected by determining that a user is attempting to access the client application 148 or features of the client application 148 that require user authentication.

At step 603, the client application 148 can obtain biometric data from the user. The biometric data can comprise one or more images captured using the image capture sensors 143 of the client device 106.

At step 605, the client application 148 can authenticate the biometric data using a biometric authentication model 131 obtained from the identity service 122, as is described in the discussion of FIG. 5, for example. The client application 148 can provide the biometric data as an input into the biometric authentication model 131, which can output an indication of whether the user is authenticated or is entitled to access the client application 148. In some examples, the biometric authentication model 131 can output a user identifier or a user token associated with the user, which the client application 148 can utilize to access data on behalf of the user.

In some examples, the biometric authentication model 131 that is utilized to authenticate the biometric data can require multiple samples of biometric data, such as multiple images of the user captured using the image capture sensors 143 of the client device 106. The biometric authentication model 131 can allow the client application 148 to biometrically authenticate multiple users and is separate from system-level biometric authentication capabilities of the client device 106.

In some examples, the client application 148 can require an additional authentication factor before authenticating the user using the biometric data. The additional authentication factor can comprise a PIN, revolving authentication token, a password, or another secondary authentication factor.

At step 607, the client application 148 can provide the captured biometric data to the identity service 122. The captured biometric data can be utilized to update or retrain the biometric authentication model 131 utilized by the client application 148. Because the client application 148 is obtaining biometric data from the user, this data can also be used to update the biometric authentication model 131 to improve its ability to authenticate users. In some examples, step 607 can be skipped if the identity service 122 cannot be contacted by the client device 106.

At step 609, the identity service 122 can retrain or update the biometric authentication model 131 based upon the biometric data received at step 607. At step 611, the identity service 122 can store the updated biometric authentication model 131 in the data store 112.

At step 615, the biometric authentication model 131 can be provided to one or more instances of the client application 148. The identity service 122 can provide the biometric authentication model 131 only to those instances of the client application 148 that are associated with a location, group, organization, or other category for which the biometric authentication model 131 is configured to authenticate users based upon biometric data 136.

In some examples, the identity service 122 can notify instances of the client application 148 that have a previous version of an updated biometric authentication model 131 that the updated biometric authentication model 131 is available. The instances of the client application 148, in response to receiving such a notification, can requested the updated biometric authentication model 131 from the identity service 122.

The sequence diagrams of FIGS. 5-6 show examples of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the sequence diagrams of FIGS. 5-6 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 106, computing environment 103, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 121, identity service 122, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

What is claimed is:

1. A system comprising:
a client device comprising a processor and memory, wherein the client device executes a client application, wherein the client device is configured to, in response to a request from a user to access the client application:
   determine that biometric authentication is required to access the client application;
   capture at least one image of the user using at least one image sensor associated with the client device;
   perform a process to authenticate the user based upon the at least one image using a biometric authentication model, wherein the biometric authentication model is separate from a system level facial recognition capability of the client device and has been trained using an image dataset associated with a population of users authorized to access the client application; and
   authorize access to the application according to an output of the biometric authentication model.

2. The system of claim 1, further comprising:
one or more computing devices that are connected to the client device over a network, wherein the one or more computing devices are configured to train the biometric authentication model using the image dataset associated with the population of users authorized to access the client application.

3. The system of claim 2, wherein the one or more computing devices retrain the biometric authentication model each time any user of the population of users is authenticated using the biometric authentication model, and any time a new user is enrolled using at least one image of the new user and user credentials associated with the user.

4. The system of claim 3, wherein the at least one image includes at least one of a user's face, head, and neck area, and the client device transmits the at least one image to the one or more computing devices for retraining.

5. The system of claim 1, wherein the biometric authentication model is provided to the client device and executed on the client device, and the process to authenticate the user based upon the at least one image uses the biometric authentication model that is executing on the client device.

6. The system of claim 2, wherein the process to authenticate the user based upon the at least one image uses the biometric authentication model that is executing on the one or more computing devices.

7. The system of claim 1, wherein the biometric authentication model outputs an indication that the user is authenticated or is entitled to access the client application.

8. The system of claim 1, wherein the biometric authentication model outputs a user identifier or a user token associated with the user, which the client application utilizes to access data on behalf of the user.

9. A method executed on a client device that has a client application installed therein, said method being performed by the client device in response to a request from a user to access the client application and comprising:
   determining that biometric authentication is required to access the client application;
   capturing at least one image of the user using at least one image sensor associated with the client device;
   performing a process to authenticate the user based upon the at least one image using a biometric authentication model, wherein the biometric authentication model is separate from a system level facial recognition capability of the client device and has been trained using an image dataset associated with a population of users authorized to access the client application; and
   authorizing access to the application according to an output of the biometric authentication model.

10. The method of claim 9, wherein one or more computing devices are connected to the client device over a network and are configured to train the biometric authentication model using the image dataset associated with the population of users authorized to access the client application.

11. The method of claim 10, wherein the one or more computing devices retrain the biometric authentication model each time any user of the population of users is authenticated using the biometric authentication model, and any time a new user is enrolled using at least one image of the new user and user credentials associated with the user.

12. The method of claim 11, wherein the at least one image includes at least one of a user's face, head, and neck area, and the client device transmits the at least one image captured thereby to the one or more computing devices for retraining.

13. The method of claim 9, wherein the biometric authentication model is provided to the client device and executed on the client device, and the process to authenticate the user based upon the at least one image uses the biometric authentication model that is executing on the client device.

14. The method of claim 10, wherein the process to authenticate the user based upon the at least one image uses the biometric authentication model that is executing on the one or more computing devices.

15. The method of claim 10, wherein the biometric authentication model outputs an indication that the user is authenticated or is entitled to access the client application.

16. The method of claim 10, wherein the biometric authentication model outputs a user identifier or a user token associated with the user, which the client application utilizes to access data on behalf of the user.

17. A non-transitory computer-readable medium comprising instructions executable in a client device that is executing a client application, wherein the instructions when executed in the client device carries out a method in response to a request from a user to access the client application, said method comprising:
- determining that biometric authentication is required to access the client application;
- capturing at least one image of the user using at least one image sensor associated with the client device;
- performing a process to authenticate the user based upon the at least one image using a biometric authentication model, wherein the biometric authentication model is separate from a system level facial recognition capability of the client device and has been trained using an image dataset associated with a population of users authorized to access the client application; and
- authorizing access to the application according to an output of the biometric authentication model.

18. The non-transitory computer-readable medium of claim 17, wherein one or more computing devices are connected to the client device over a network and are configured to train the biometric authentication model using the image dataset associated with the population of users authorized to access the client application.

19. The non-transitory computer-readable medium of claim 17, wherein the biometric authentication model is provided to the client device and executed on the client device, and the process to authenticate the user based upon the at least one image uses the biometric authentication model that is executing on the client device.

20. The non-transitory computer-readable medium of claim 18, wherein the process to authenticate the user based upon the at least one image uses the biometric authentication model that is executing on the one or more computing devices.

* * * * *